(12) United States Patent
Syamoto (10) Patent No.: US 6,500,092 B2
(45) Date of Patent: Dec. 31, 2002

(54) SHIFT APPARATUS FOR VEHICLES

(75) Inventor: Noriyasu Syamoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 57 days.

(21) Appl. No.: 09/867,283

(22) Filed: May 29, 2001

(65) Prior Publication Data

US 2002/0016233 A1 Feb. 7, 2002

(30) Foreign Application Priority Data

May 31, 2000 (JP) ........................................ 2000-161708

(51) Int. Cl.[7] ............................................... F16H 59/74
(52) U.S. Cl. ........................ 477/99; 70/252; 200/61.91
(58) Field of Search .......................... 477/99; 200/43.03, 200/61.91; 70/252

(56) References Cited

U.S. PATENT DOCUMENTS

| 4,583,171 A | 4/1986 | Hara et al. |
| 4,884,057 A | 11/1989 | Leorat |
| 5,528,953 A | 6/1996 | Steinle et al. |
| 5,884,528 A * | 3/1999 | Ludanek et al. ............ 74/473.3 |
| 6,295,887 B1 * | 10/2001 | DeJonge et al. ........... 74/473.3 |

FOREIGN PATENT DOCUMENTS

| CA | 1212557 | 10/1986 |
| DE | 197 47 269 A1 | 4/1999 |
| EP | 0 121 167 | 10/1984 |
| GB | 2 310 693 A | 9/1997 |
| JP | 4-232145 A | 8/1992 |
| JP | 4-254222 | 9/1992 |

* cited by examiner

*Primary Examiner*—Dirk Wright
(74) *Attorney, Agent, or Firm*—Crompton, Seager & Tufte, LLC

(57) ABSTRACT

A shift apparatus for shifting gears in a vehicle. The shift apparatus includes a shift selector rotated between a plurality of predetermined positions to instruct the shifting of gears in accordance with the position of the shift selector. A controller confirms whether the person operating the shift apparatus is the proper user and excites and de-excites a solenoid to lock and unlock the shift selector. An engine start actuator is arranged at substantially the same location as the shift selector to instruct the starting of the engine when pushed.

16 Claims, 10 Drawing Sheets

SHIFT APPARATUS FOR VEHICLES

BACKGROUND OF THE INVENTION

The present invention relates to a transmission gear shift apparatus for vehicles.

A conventional automatic transmission shifts gears by connecting and releasing gearsets with a clutch based on the vehicle speed or throttle opening. Further, a manual shift valve is actuated when a parking position or reverse gear is selected. The manual shift valve is also actuated when restricting forward gears to a predetermined low speed gear.

The manual shift valve is switched by a lever installed near the driver's seat. In a shift-by-wire automatic transmission, an actuator, which is operated by switches, shifts the manual shift valve. In this structure, an electric circuit connects the switch and the actuator. It is desirable that the electric circuit be used more effectively to make such a shift apparatus more compact, for example, by connecting an ignition switch, which starts the engine, to the electric circuit or by concentrating various switches and lever operation transmission mechanisms within a small area.

SUMMARY OF THE INVENTION

It is an object of the present invention to provide a compact transmission shift apparatus for vehicles.

To achieve the above object, the present invention presents a shift apparatus for shifting gears in a vehicle driven by an engine. The shift apparatus includes a shift selector that rotates between a plurality of predetermined positions to instruct the shifting of gears in accordance with the position of the shift selector. A movable engine start actuator is arranged at substantially the same location as the shift selector to instruct the starting of the engine when the actuator is pushed. A confirming device confirms that the person operating the shift apparatus is the proper user. An enabling device enables the movement of the engine start actuator based on the confirmation result of the confirming device. A first detector detects whether the engine start actuator is pushed. A second detector detects the position of the shift selector. A controller starts the engine based on the detection result of the first detector and shifts gears based on the detection result of the second detector.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment according to the present invention will now be described with reference to FIGS. 1 to 10. A shift apparatus 13 is located on an instrument panel 12 in front and toward the left of a driver's seat 11, as viewed in FIG. 1. A brake pedal 37 is located in front of the driver's seat 11 at a low position.

Figure 1:
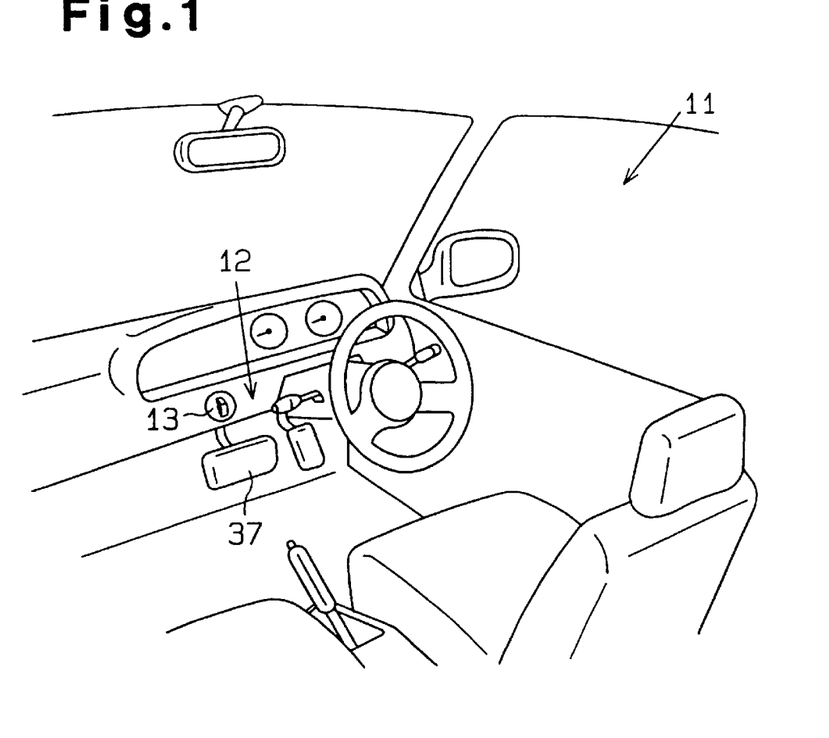
FIG. 1 is a diagram showing a driver's seat of an automatic transmission vehicle according to a first embodiment of the present invention.
Figure 2:
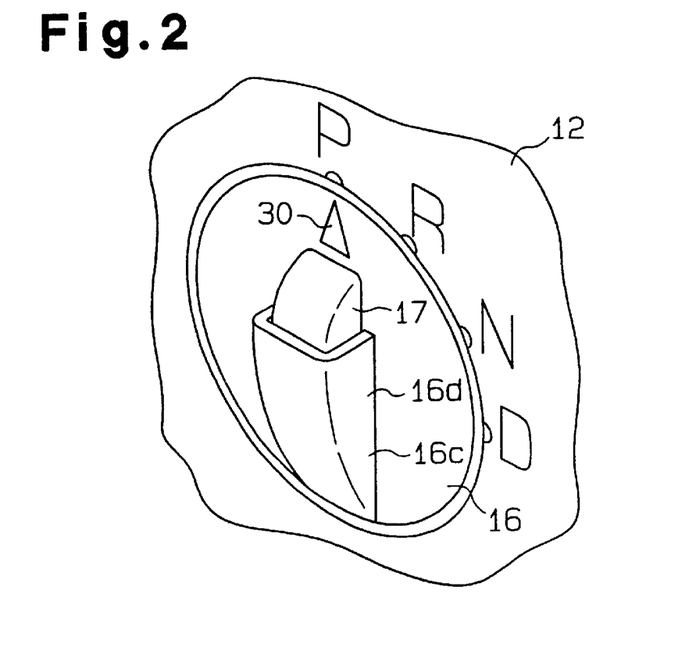
FIG. 2 is a partial perspective view showing an instrument panel in the automatic transmission vehicle.
Figure 3:
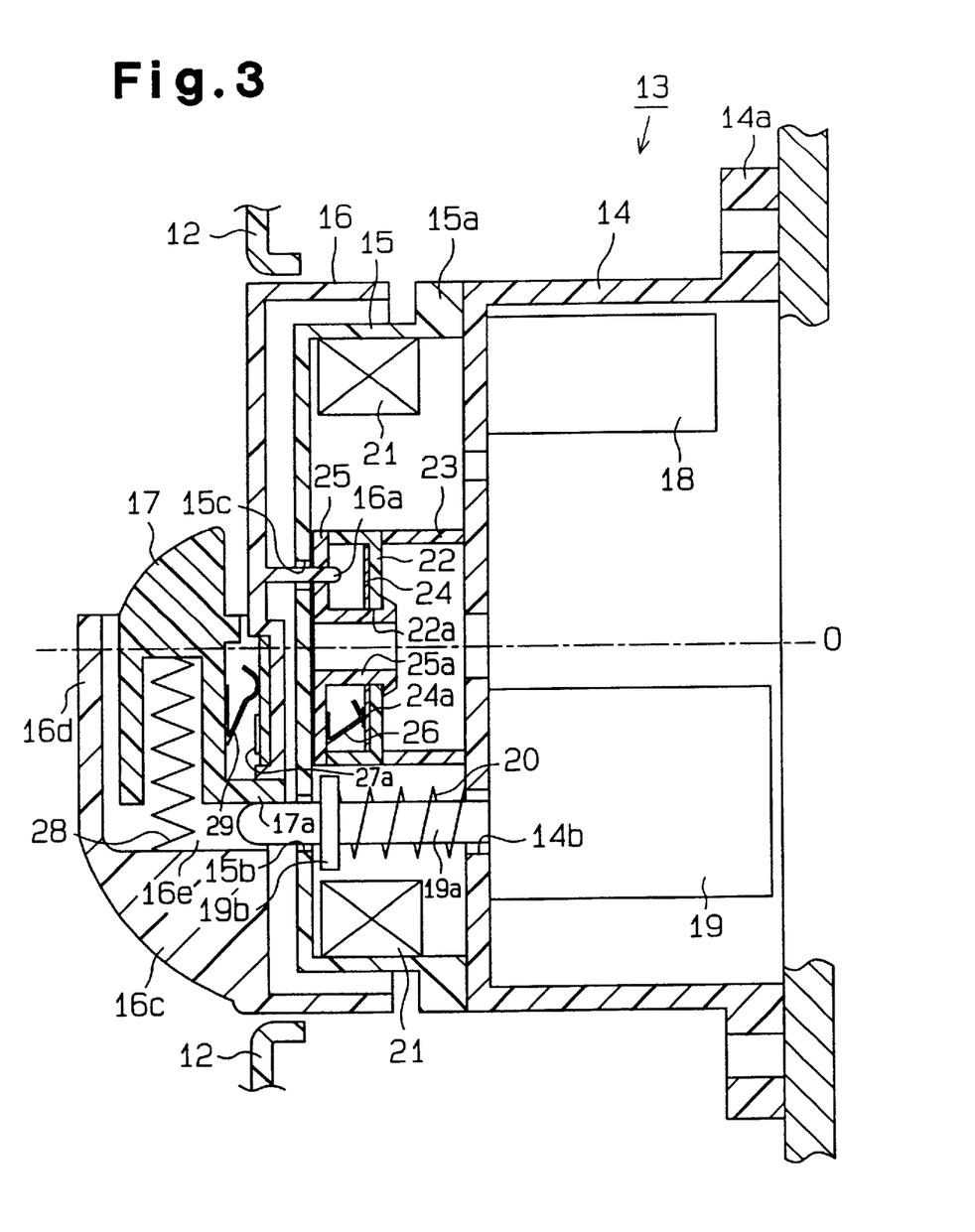
FIG. 3 is a cross-sectional side view showing a shift apparatus.

With reference to FIG. 3, the left side of the drawing is referred to as the front side, the right side of the drawing is referred to as the rear side, the far side of the apparatus 13 in a direction perpendicular to the plane of the drawing is referred to as the right side, and the near side of the apparatus in a direction perpendicular to the plane of the drawing is referred to as the left side. As shown in FIGS. 2 and 3, a unit that includes a support base 14, a fixed base 15, a knob 16, and a push button 17 forms the shift apparatus 13. The knob 16 functions as a shift selector, and the push button 17 functions as an engine start actuator.

The support base 14 is cylindrical and has a front end closed by a plate. A flange 14a, which extends radially outward from the rear end of the support base 14, is fixed to a member (not shown) in the instrument panel 12. A controller 18, which is a shift ECU, is fixed to the rear side of the end plate in the support base 14. A solenoid 19, which is electrically connected to the controller 18, is fixed to the rear side of the end plate in the support base 14. The controller 18 is located above an axis O of the support base 14 and the solenoid 19 is located below the axis O. The solenoid 19 has a plunger 19a, which extends through a hole 14b formed in the end plate of the support base 14. The solenoid 19 functions as an enabling device.

The plunger 19a moves between a lock position and an unlock position. The plunger 19a is extended from the solenoid 19 at the lock position and retracted in the solenoid 19 in the unlock position. A flange 19b is provided at the front portion of the plunger 19a. A spring 20 is arranged on the plunger 19a between the flange 19b and the end plate of the support base 14 to urge the plunger 19a toward the lock position. Thus, the plunger 19a is normally located at the lock position.

Figure 4:
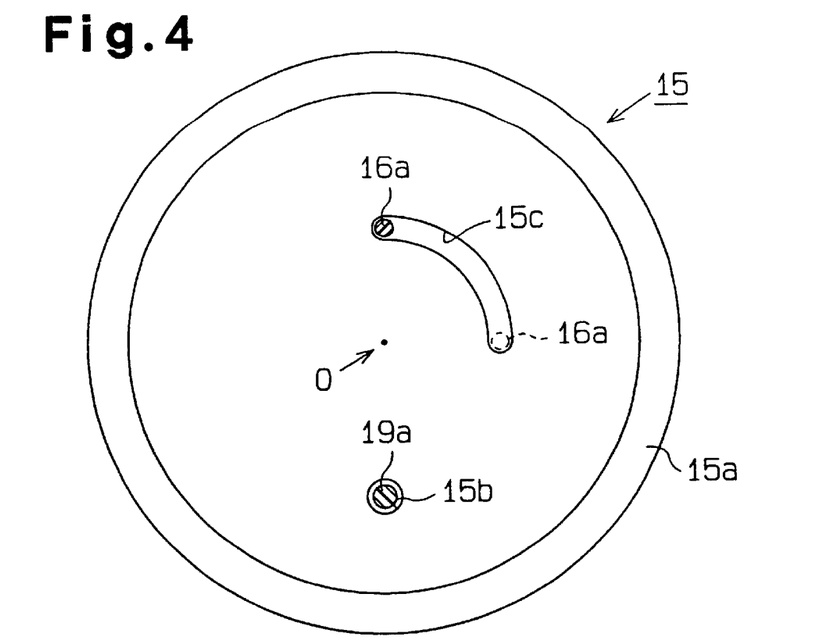
FIG. 4 is a front view showing a fixed base.

The fixed base 15 is secured to the end plate of the support base 14. The fixed base 15 is cylindrical and has a front end closed by a plate. A flange 15a, which extends radially outward from the rear end of the fixed base 15, is fixed to the peripheral portion of the end plate of the support base 14. Referring to FIG. 4, a hole 15b extends through the end plate of the fixed base 15 for receiving the front end of the plunger 19a. The hole 15b is located at an intermediate position between the axis O and the lowermost edge of the fixed base 15. Further, an arcuate elongated hole 15c is formed in the end plate of the fixed base 15. The elongated hole 15c extends by about 90 degrees from a point above the axis O. As shown in FIG. 3, a coil 21 is arranged in the fixed base 15. The coil 21 is electrically connected to the controller 18. The coil 21 and the controller 18 function as a confirming device.

Figure 5:
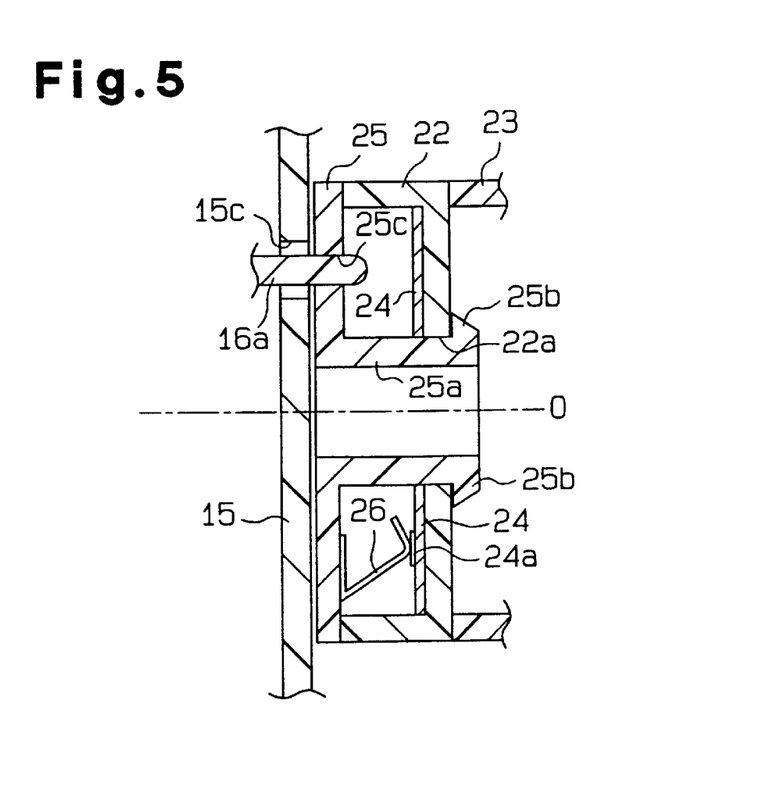
FIG. 5 is an enlarged partial cross-sectional view showing the shift apparatus.
Figure 6:
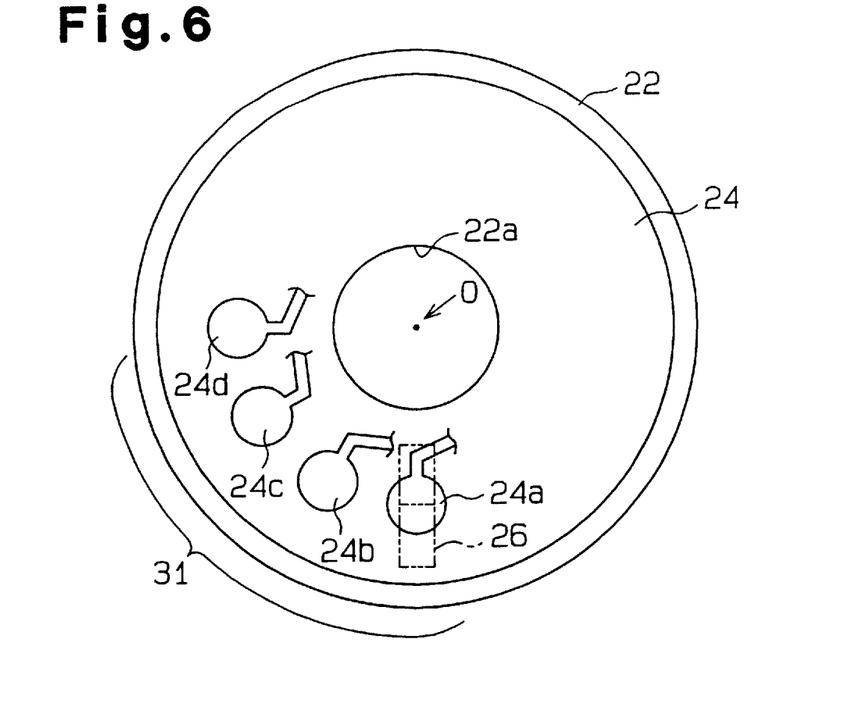
FIG. 6 is a front view showing a fixed cylinder.

A fixed cylinder 22, which has a rear end closed by a plate, is fixed to the end plate of the support base 14 by way of a support cylinder 23. The support base 14, the fixed cylinder 22, and the support cylinder 23 are concentric. As shown in FIGS. 5 and 6, the fixed cylinder 22 has a round fitting hole 22a, which extends through the center of its end plate. A printed circuit board 24 is fixed to the front side of the end plate in the fixed cylinder 22 and laid out about the fitting hole 22a. As shown in FIG. 6, four fixed electrodes 24a, 24b, 24c, 24d are connected to the printed circuit board 24 along an imaginary circle, the center of which is the axis O. The fixed electrodes 24a–24d are each electrically connected to the controller 18. The fixed electrode 24a is located below the axis O as viewed in FIG. 6. The other electrodes 24b–24d are respectively arranged in the clockwise direction from the fixed electrode 24a at angular intervals of 30 degrees.

With reference to FIG. 5, a rotor plate 25 is rotatably supported on the end surface of the fixed cylinder 22. More specifically, a tubular portion 25a extending from the center of the rotor plate 25 is rotatably fit in the fitting hole 22a. Thus, the rotor plate 25 is supported rotatably about the axis O. The tubular portion 25a has an engaging flange 25b, which is engaged with the end plate of the fixed cylinder 22 to secure the rotor plate 25 to the fixed cylinder 22. A movable electrode 26, which is made of a conductive metal, is fixed to the rear side of the rotor plate 25. The movable electrode 26 is electrically connected to the controller 18 by a lead wire (not shown).

The movable electrode 26 is made from a metal plate having elasticity. This constantly urges the movable electrode 26 toward the printed circuit board 24. Thus, as the rotor plate 25 rotates, the movable electrode 26 selectively contacts the fixed electrodes 24a–24d. The movable electrode 26 and the fixed electrodes 24a–24d form a shift switch 31 that functions as a second detector. A connecting hole 25c extends through the rotor plate 25 at a location corresponding to one end of the elongated hole 15c.

With reference to FIG. 3, the knob 16, which is cylindrical and has a front end closed by a plate, is arranged on the fixed base 15 to cover the fixed base 15. The knob 16 is concentric with the support base 14. A projection 16a projects rearwardly from the end plate of the knob 16. The projection 16a is located slightly above the axis O. Further, the projection 16a is received by the elongated hole 15c and pressed into the connecting hole 25c (FIG. 5). The elongated hole 15c allows the projection 16a to be rotated about the axis O. Accordingly, the knob 16 rotates integrally with the rotor plate 25 about the axis O.

Figure 7:
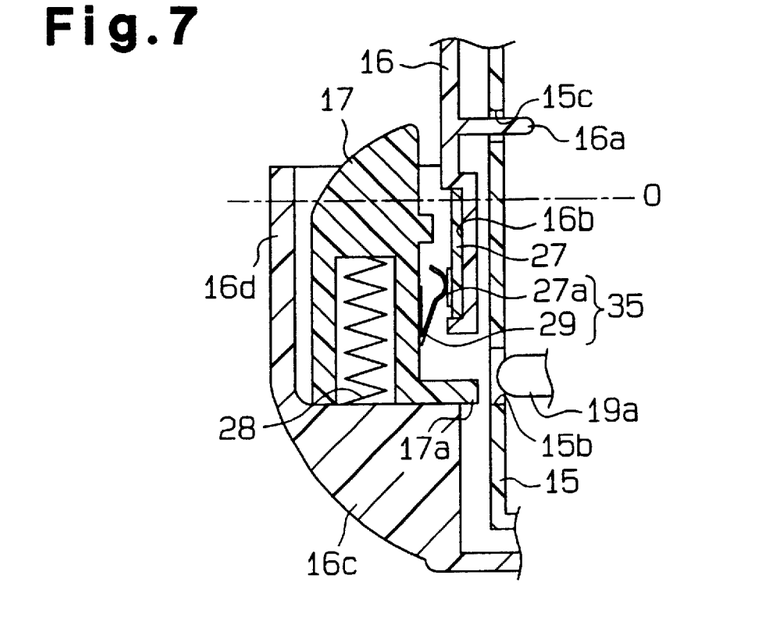
FIG. 7 is an enlarged partial cross-sectional view showing the shift apparatus.
Figure 8:
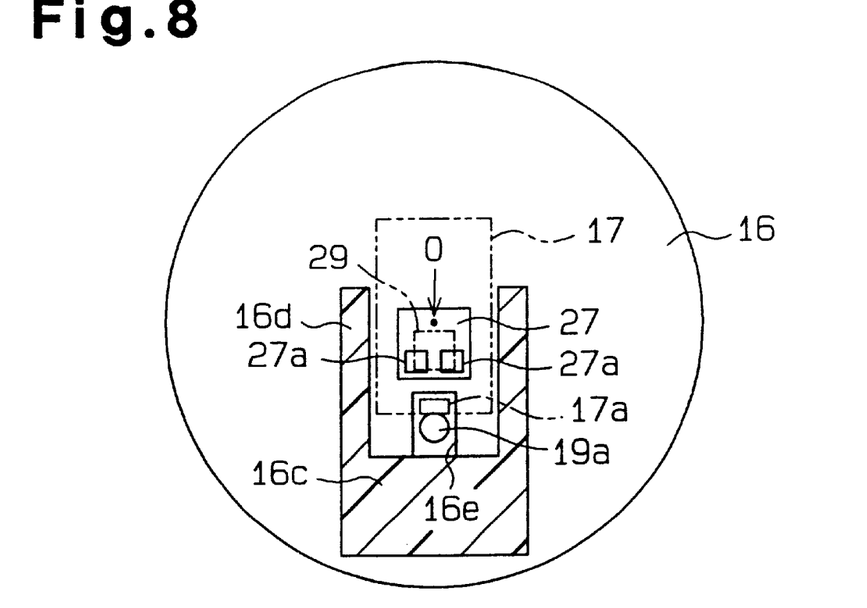
FIG. 8 is a partial cross-sectional front view showing a knob.

As shown in FIG. 7, a recess 16b is provided in the front side of the end plate of the knob 16. A circuit board 27 is fixed in the recess 16b. Referring to FIG. 8, a pair of fixed electrodes 27a, which are formed from a conductive metal, are arranged on the lower front surface of the circuit board 27. The two fixed electrodes 27a are electrically connected to the controller 18.

As shown in FIGS. 2 and 3, a grip 16c is formed on the front side of the knob 16. The grip 16c has a lower portion and a guide portion 16d. The projection amount of the lower portion relative to the end plate of the knob 16 increases gradually from the lowermost section of the grip 16c toward the axis O. The cross-section of the grip 16c is cup-like when viewed from the front side.

A push button 17, which moves vertically, is received by the guide portion 16d. The push button 17 is hollow and has an opened lower end. A spring 28 is accommodated in the hollow portion of the push button 17. One end of the spring 28 contacts the bottom surface of the guide portion 16d. The spring 28 urges the push button 17 upward. A tab 17a projects rearwardly from the lower rear side push button 17.

Referring to FIGS. 3 and 8, the push button 17 is urged upward by the spring 28. A lock space 16e is formed between the bottom surface in the grip 16c and the lower end of the push button 17. The distal end of the plunger 19 moves into and out of the lock space 16e. The lock space 16e opposes the plunger 19a only when a pointer 30 (FIG. 2) on the knob 16 is pointed to "P".

When the distal end of the plunger 19a is inserted in the lock space 16e, or when the plunger 19a is located at the lock position, the plunger 19a prohibits rotation of the knob 16. When the plunger 19a is not inserted in the lock space 16e, or when the plunger 19a is located at the unlock position, rotation of the knob 16 about the axis O is enabled.

When the plunger 19a is moved out of the lock space 16e, downward movement of the tab 17a is enabled. In other words, the push button 17 may be moved downward against the force of the spring 28. A movable electrode plate 29 made of a conductive metal is fixed to the rear side of the push button 17. The elasticity of the movable electrode plate 29 constantly urges the movable electrode plate 29 toward the circuit board 27. When the push button 17 is pushed until the tab 17a contacts the bottom surface in the grip 16c, the movable electrode plate 29 is simultaneously connected to the two fixed electrodes 27a. The two fixed electrodes 27a and the movable electrode plate 29 form an ignition switch 35 (FIG. 7) and function as a first detector.

Referring to FIG. 2, alphabetic characters are marked on the instrument panel 12. Alphabet characters P, R, N, D respectively indicate a parking position, a reverse drive position, a neutral position, and a forward drive position. The pointer 30 is marked on the front surface of the knob 16. When the pointer 30 is pointed toward P, the movable electrode 26 and the fixed electrode 24a of the printed circuit board 24 are electrically connected. When the pointer 30 is pointed toward R, N, D, the movable electrode 26 is electrically connected to the fixed electrodes 24b, 24c, 24d, respectively.

The electric structure of the shift apparatus 13 and peripheral devices will now be discussed.

Figure 9:
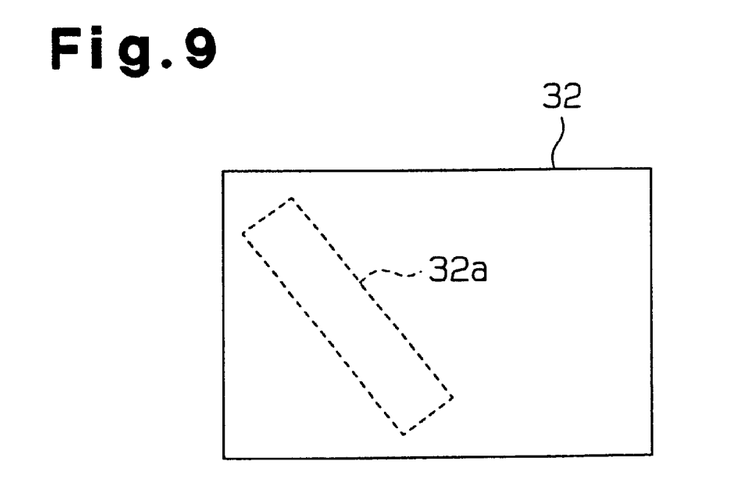
FIG. 9 is a front view showing a card key.
Figure 10:
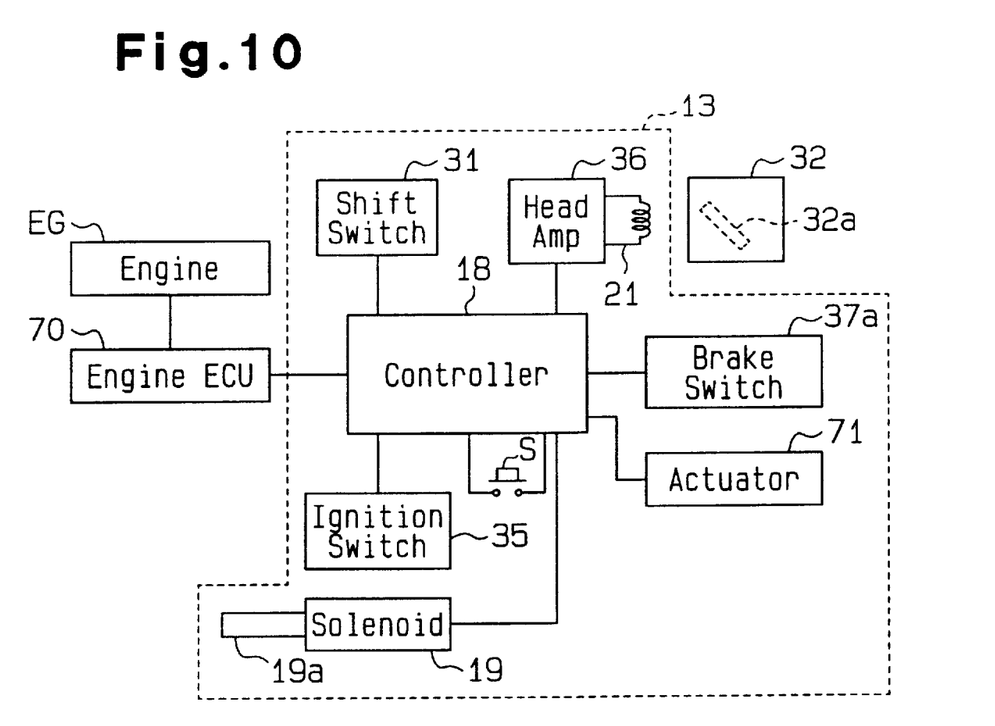
FIG. 10 is a block diagram showing the electric structure of the shift apparatus.

FIG. 9 shows a card key 32, which is provided separately from the shift apparatus 13. A transponder 32a, which stores an immobilizer identification code, is embedded in the card key 32. When the card key 32 is held near the coil 21, the transponder 32a transmits the immobilizer identification code to the controller 18 via the coil 21. A brake switch 37a (FIG. 10), which sends a brake detection signal to the controller 18 when the brake pedal 37 is depressed, is arranged in the vicinity of the brake pedal 37. As shown in FIG. 10, the controller 18 of the shift apparatus 13 is electrically connected to an engine EG by an engine ECU 70.

A head amplifier 36 connects the controller 18 and the coil 21 to each other. The head amplifier 36 amplifies a determination request signal, which is output from the controller 18 and sent to the coil 21. The controller 18 controls an actuator 71, which is a motor or the like, to switch a manual shift valve (not shown), which functions as a range switching valve. The manual shift valve is a spool type valve supplied with oil to transmit hydraulic pressure to the clutch, the brake, or the like through a passage in correspondence with the driving range that is determined by the gearshift position.

The operation of the shift apparatus 13 of the first embodiment will now be discussed.

In an initial state of the shift apparatus 13, or when the engine EG is stopped, the pointer 30 of the knob 16 is pointed toward P. Thus, the fixed electrode 24a is connected to the movable electrode 26, and the controller 18 receives a stop position signal. Further, the plunger 19a is located at the lock position, the rotation of the knob 16 is prohibited (the knob 16 is locked), and the movement of the push button 17 is disabled (the push button 17 is locked).

When a power switch S, which is located on the instrument panel 12, is pushed, the controller 18 sends a determination request signal to the head amplifier 36. The head amplifier 36 amplifies the determination request signal and sends the amplified signal to the coil 21. If the card key 32 is held near the shift apparatus 13 in this state, the coil 21 transmits the determination request signal to the transponder 32a. When the transponder 32a receives the determination request signal, the transponder 32a transmits the immobilizer identification code to the head amplifier 36 via the coil 21. The head amplifier 36 then sends the immobilizer identification code to the controller 18. The controller 18 compares the immobilizer identification code with a prestored vehicle identification code. When the codes match, the controller 18 verifies the card key 32 and determines that the card key 32 is held by the proper user. In such case, the controller 18 stores key recognition information.

When the brake pedal 37 is depressed in this state, the brake switch 37a sends a brake detection signal to the controller 18. The controller 18 sends an excitation signal to the solenoid 19 if the controller 18 stores the key recognition information and receives the brake detection signal. More specifically, when the engine EG is not running, the controller 18 unlocks the solenoid 19 when two conditions are both satisfied. The first condition is that the controller 18 receives the key recognition information, which indicates that the proper user is holding the card key 32, and the second condition is that the controller 18 receives the brake detection signal.

Based on the excitation signal, the solenoid 19 moves the plunger 19a from the lock position to the unlock position. This enables the movement of the push button 17 and the rotation of the knob 16. In this state, when the push button 17 is pushed as shown in FIG. 7, the movable electrode plate 29 is connected to the two fixed electrodes 27a. This turns on the ignition switch 35 and sends an engine start signal to the controller 18. The controller 18 sends an engine drive permission signal to the engine ECU 70 based on the engine start signal. The engine ECU 70 then starts the engine EG based on the engine drive permission signal.

Subsequently, if the knob 16 is rotated from the P position to the R position with the brake pedal 37 in a depressed state, the fixed electrode 24b and the movable electrode 26 are connected. Thus, the controller 18 receives a reverse drive position signal. The controller 18 then drives the actuator 71 based on the reverse drive position signal.

When the brake pedal 37 is released after the engine ECU 70 starts the engine EG, the controller 18 de-excites the solenoid 19 based on a brake release signal sent from the brake switch 37a. Thus, the spring 20 moves the plunger 19a of the solenoid 19 toward the lock position. However, the lock space 16e is separated from the plunger 19a due to the position of the knob 16. Thus, the plunger 19a abuts the rear side of the knob 16.

When the knob 16 is further rotated to a position corresponding to N, the fixed electrode 24c and the movable electrode 26 are connected. Thus, the controller 18 receives a neutral position signal. The controller 18 controls the actuator in correspondence with the neutral position based on the neutral position signal.

When the knob 16 is further rotated to a position corresponding to D, the fixed electrode 24d and the movable electrode 26 are connected. Thus, the controller 18 receives a drive position signal. The controller 18 controls the actuator 71 in correspondence with the drive position based on the drive position signal.

If the knob 16 is rotated from a position where the pointer 30 is pointed to R, N, or D to the position where the pointer 30 is pointed to P when the brake pedal 37 is not depressed, the lock space 16e becomes aligned with the plunger 19a. Thus, the force of the spring 20 moves the plunger 19a to the lock position. The distal portion of the plunger 19a is inserted through the hole 15b and into the lock space 16e to lock the knob 16.

If the brake pedal 37 is depressed when the engine EG is running, the brake switch 37a sends the brake detection signal to the controller 18 and the controller 18 excites the solenoid 19 and moves the plunger 19a to the unlock position. Accordingly, to rotate the knob 16 from a position where the pointer 30 is pointed to P to a position where the pointer 30 is pointed to R, N, or D, the card key 32 need not be verified again and the brake pedal 37 need only be depressed.

To stop the engine EG, the power switch S is pushed in a state in which the pointer 30 of the knob 16 is pointed toward P. This causes the controller 18 to send an engine stop signal to the controller 18. Based on the engine stop signal, the engine ECU 70 stops the engine EG.

In the shift apparatus 13 of the first embodiment, the push button 17 is accommodated in the knob 16. Thus, in comparison to when the push button 17 and the knob 16 are separated, the shift apparatus 13 has fewer components, uses space more efficiently, is more compact, and is unitized more easily.

When the engine EG is stopped, the plunger 19a is moved from the lock position to the unlock position when the brake pedal 37 is depressed after the controller 18 and the coil 21 confirm from the transponder 32a of the card key 32 that the proper user is holding the card key 32. This unlocks the push button 17 and the knob 16. The knob 16 and the push button 17 remain locked unless the controller 18 confirms that the card key 32 is held by the proper user. This prevents the vehicle from being stolen. In addition, the knob 16 cannot be rotated unless the brake pedal 37 is depressed. This prevents the vehicle from moving suddenly.

The same solenoid 19 enables and disables the movement of the knob 16 and the push button 17. This simplifies the structure of the shift apparatus 13 and reduces cost.

A shift apparatus 50 according to a second embodiment of the present invention will now be discussed with reference to FIGS. 11 to 15. The second embodiment is a modification of the first embodiment. Thus, like elements will be denoted with the same reference numbers and will not be described in detail. Only differing elements will be described.

Figure 15:
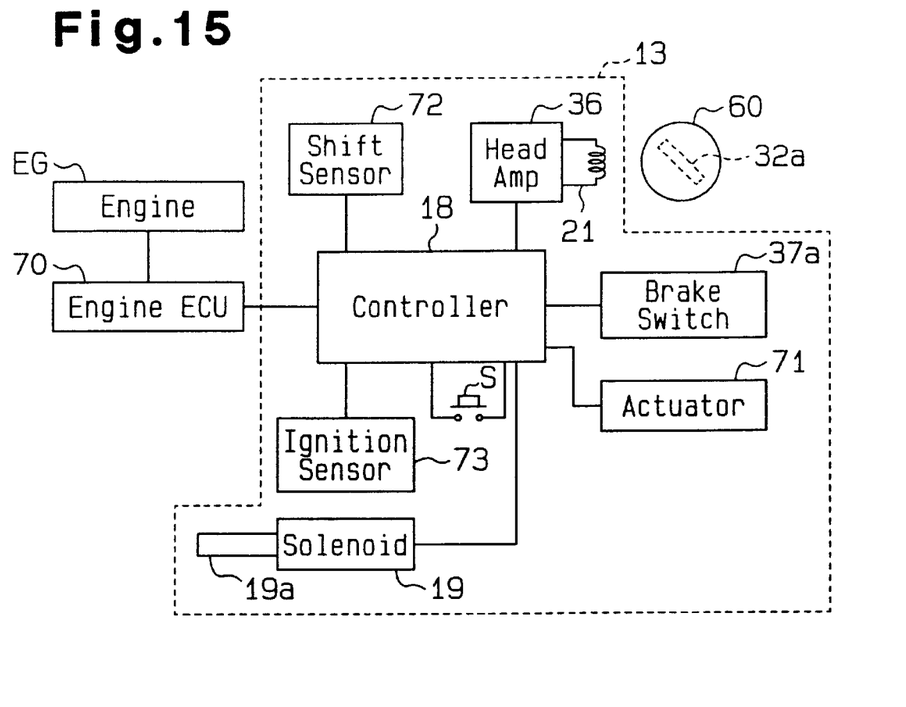
FIG. 15 is a block diagram showing the electric structure of the shift apparatus of the second embodiment.

In the first embodiment, the shift switch 31 and the ignition switch 35 are contact switches. However, the second embodiment employs a shift sensor 72 and an ignition sensor 73, which are non-contact sensors (FIG. 15).

Figure 12:
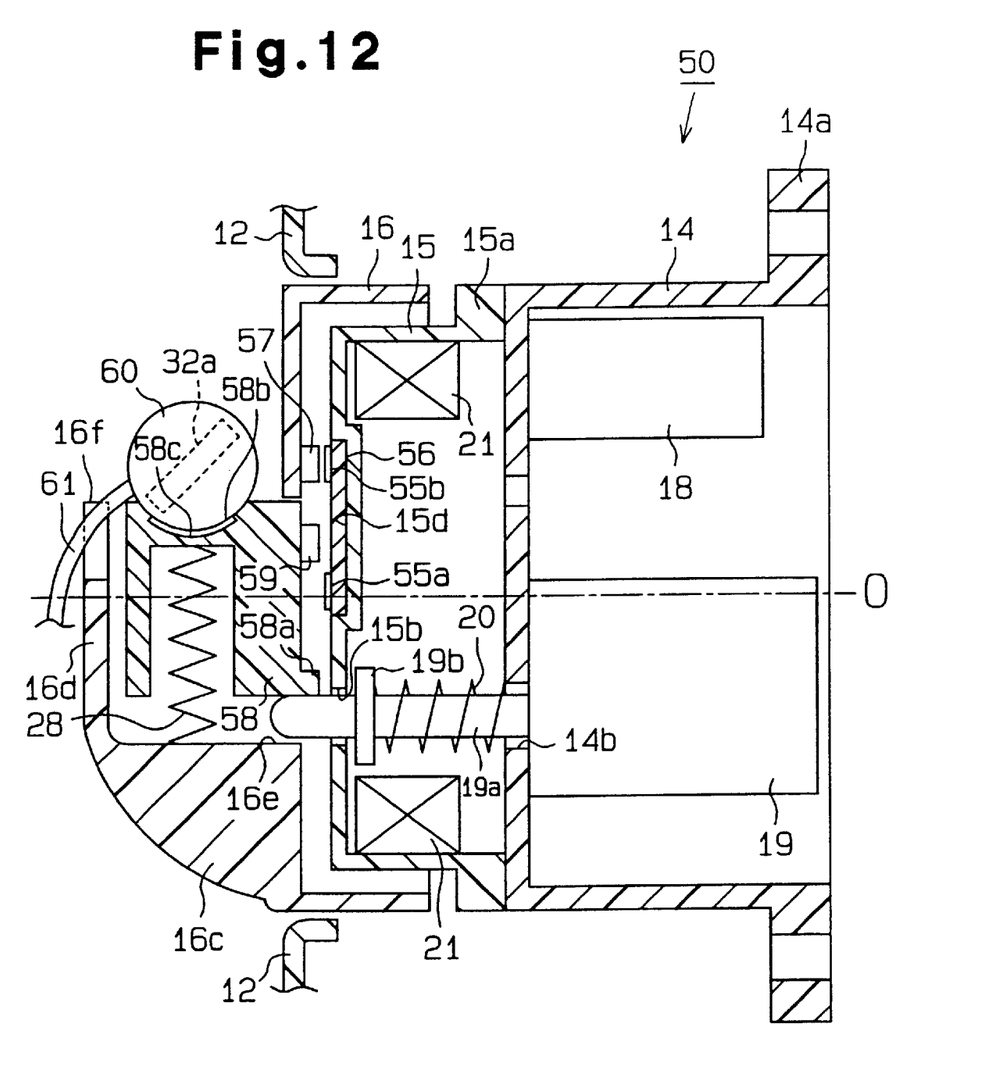
FIG. 12 is a cross-sectional side view showing a shift apparatus in the second embodiment.
Figure 13:
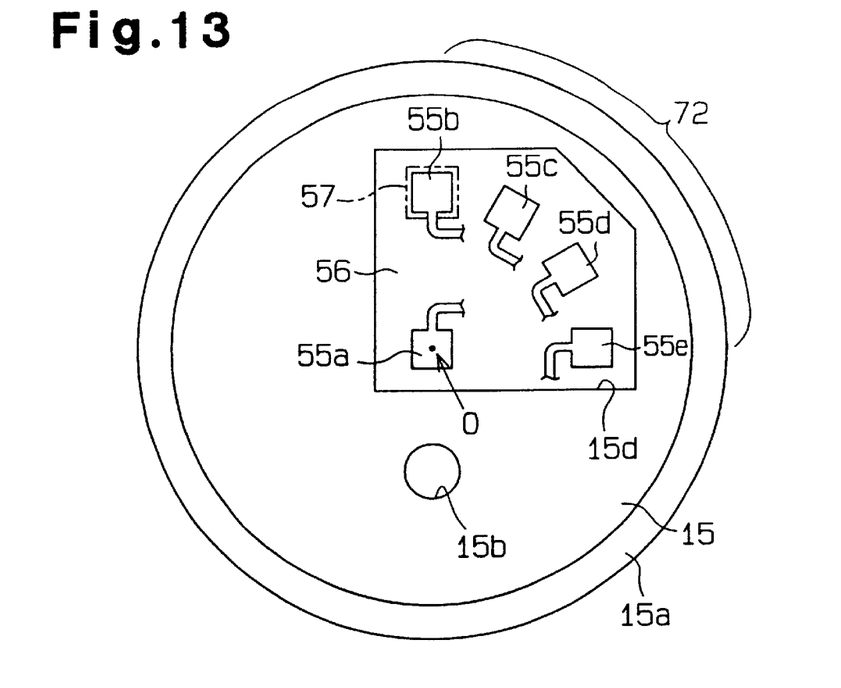
FIG. 13 is a front view showing a fixed base in the second embodiment.

As shown in FIGS. 12 and 13, in the shift apparatus 50, a recess 15d is provided in the front side of the end plate of the fixed base 15. The recess 15d is offset upward from the center of the fixed base 15. A circuit board 56 is fixed in the recess 15d. Magnetic resistance devices 55a, 55b, 55c, 55d, 55e are attached to the circuit board 56. The magnetic resistance devices 55a–55e are located near the axis O of the fixed base 15 and electrically connected to the controller 18. As shown in FIG. 13, the magnetic resistance devices 55b–55e are arranged along an imaginary circle, the center of which is the axis O. The magnetic resistance device 55b is located above the axis O, as viewed in FIG. 3. The other magnetic resistance devices 55c–55e are respectively arranged in the clockwise direction from the magnetic resistance device 55b in angular intervals of 30 degrees.

Figure 14:
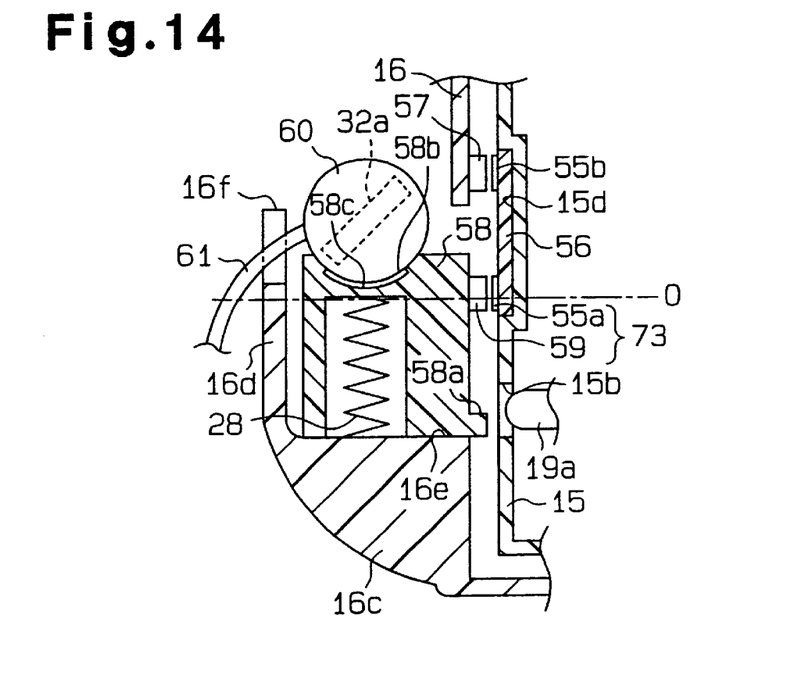
FIG. 14 is an enlarged partial cross-sectional view showing the shift apparatus of the second embodiment.

With reference to FIGS. 12 and 14, a magnet 57 is fixed to the rear side of the knob 16 at a position corresponding to the magnetic resistance device 55b. As the knob 16 rotates about the axis O, the magnet 57 opposes the magnetic resistance devices 55b–55e. The magnetic resistance devices 55b–55e form the shift sensor 72.

Figure 11:
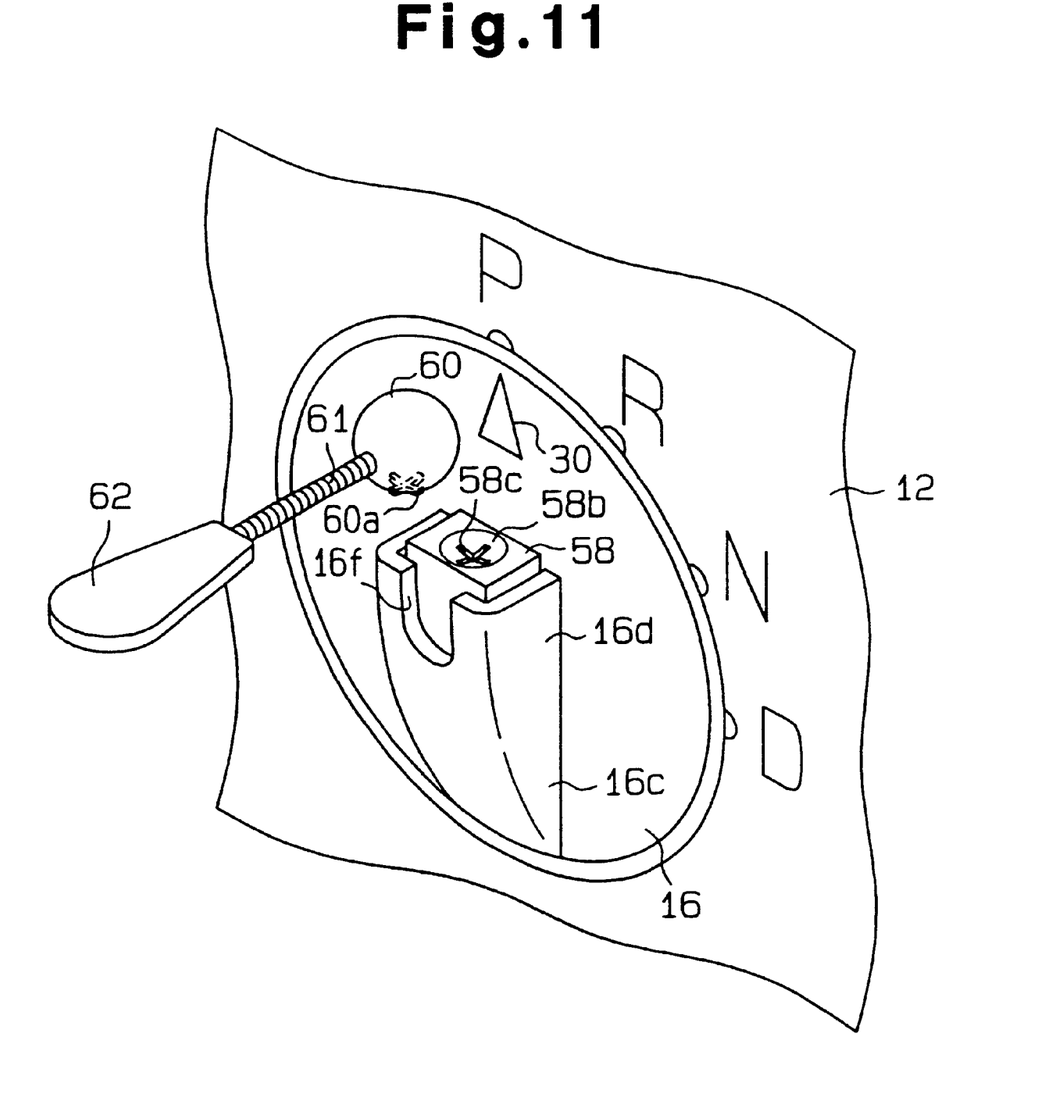
FIG. 11 is a partial perspective view showing an automatic transmission vehicle instrument panel according to a second embodiment of the present invention.

Referring to FIGS. 11 and 12, a notch 16f is formed in the upper middle section of the guide portion 16d of the grip 16c. A push button 58 that moves vertically relative to the guide portion 16d is inserted in the grip 16c. The push button 58 functions as an engine start actuator. The spring 28 urges the push button 58 upward. A tab 58a projects rearward from a lower rear portion of the push button 58. The tab 58a contacts the uppermost surface of the distal portion of the plunger 19a when the plunger 19a is located at the lock position.

When the plunger 19a is located at the unlock position, the push button 58 is permitted to move downward against the force of the spring 28. A magnet 59 is fixed to the rear side of the push button 58. When the push button 58 is pushed to the lowermost position, the magnet 59 and the magnetic resistance device 55a become opposed to each other (FIG. 14). In the second embodiment, the magnetic resistance device 55a functions as the ignition sensor 73, which detects the magnet 59, and serves as a first detector. Referring to FIGS. 11 and 12, a concave portion 58b is defined in the top end of the push button 58. A cross-like groove 58c is formed in the middle of the concave portion 58b.

With reference to FIG. 11, a spherical key 60, the curvature of which is substantially the same as that of the concave portion 58b, is provided separately from the shift apparatus 50. The transponder 32a is embedded in the key 60 (FIG. 12). A cross-like projection 60a, which fits into the groove 58c, is formed on the surface of the key 60. A flexible rod 61 connects the key 60 to a key holder 62. When the push button 58 is pushed, the rod 61 is guided by the notch 16f.

The operation of the shift apparatus 50 of the second embodiment will now be discussed.

In an initial state of the shift apparatus 50, or when the engine EG is stopped, the pointer 30 of the knob 16 is pointed toward P. Thus, the magnetic resistance device 55b and the magnet 57 oppose each other. The magnetic resistance device 55b detects the magnetic flux of the magnet 57 and sends the stop position signal to the controller 18. Further, the plunger 19a is located at the lock position, and the knob 16 and the push button 17 are locked.

When the power switch S is pushed, the head amplifier 36 sends the determination request signal to the coil 21. If the key 60 is held near the shift apparatus 50 in this state, the transponder 32a sends the immobilizer identification code to the controller 18 via the coil 21 and the head amplifier 36. The controller 18 compares the immobilizer identification code with the prestored vehicle identification code. When the codes match, the controller 18 verifies the key 60 and determines that the key 60 is held by the proper user. In such case, the controller 18 stores key recognition information.

When the brake pedal 37 is depressed in this state, the brake switch 37a sends the brake detection signal to the controller 18. The controller 18 sends the excitation signal to the solenoid 19 when the controller 18 stores the key recognition information and receives the brake detection signal. This moves the plunger 19a from the lock position to the unlock position and unlocks the push button 58 and the knob 16.

Referring to FIG. 11, when movement of the push button 58 is enabled, the projection 60a of the key 60 is fit into the groove 58c of the push button 58. In this state, if the push button 58 is pushed with the key 60, the magnetic resistance device 55a and the magnet 59 oppose each other. The magnet 59 then detects the magnetic flux of the magnetic resistance device 55a and sends the engine start signal to the controller 18. The engine ECU 70 then starts the engine EG.

Subsequently, if the knob 16 is rotated from the P position to the R position with the brake pedal 37 in a depressed state, the magnetic resistance device 55c opposes the magnet 57 and detects the magnetic flux of the magnet 57. Thus, the magnetic resistance device 55c sends the reverse drive position signal to the controller 18. The controller 18 then drives the actuator 71 based on the reverse drive position signal.

When the brake pedal 37 is released after the engine ECU 70 starts the engine EG, the controller 18 de-excites the solenoid 19. In this state, the plunger 19a is separated from the lock space 16e. Thus, the plunger 19a abuts the rear side of the knob 16.

When the knob 16 is further rotated to a position corresponding to N, the magnetic resistance device 55d opposes the magnet 57 and detects the magnetic flux of the magnet 57. Thus, the magnetic resistance device 55d sends the neutral position signal to the controller 18. The controller 18 controls the actuator in correspondence with the neutral position based on the neutral position signal. When the knob 16 is further rotated to a position corresponding to D, the magnetic resistance device 55e opposes the magnet 57 and detects the magnetic flux of the magnet 57. Thus, the magnetic resistance device 55e sends the drive position signal to the controller 18. The controller 18 controls the actuator 71 in correspondence with the drive position based on the drive position signal.

If the knob 16 is rotated from a position where the pointer 30 is pointed to R, N, or D to the position where the pointer 30 is pointed to P when the brake pedal 37 is not depressed, the knob 16 becomes locked in the same manner as the first embodiment.

Like the first embodiment, if the knob 16 is rotated from a position where the pointer 30 is pointed to P to a position where the pointer 30 is pointed to R, N, or D when the engine EG is running, the key 60 need not be verified again and the brake pedal 37 need only be depressed. To stop the engine EG, the power switch S is pushed in a state in which the pointer 30 of the knob 16 is pointed toward P in the same manner as the first embodiment.

It should be apparent to those skilled in the art that the present invention may be embodied in many other specific forms without departing from the spirit or scope of the invention. Particularly, it should be understood that the present invention may be embodied in the following forms.

Instead of using only one solenoid 19 like in the above embodiments, two solenoids 19 may be used to lock and unlock the knob 16 and the push button 17.

Figure 16:
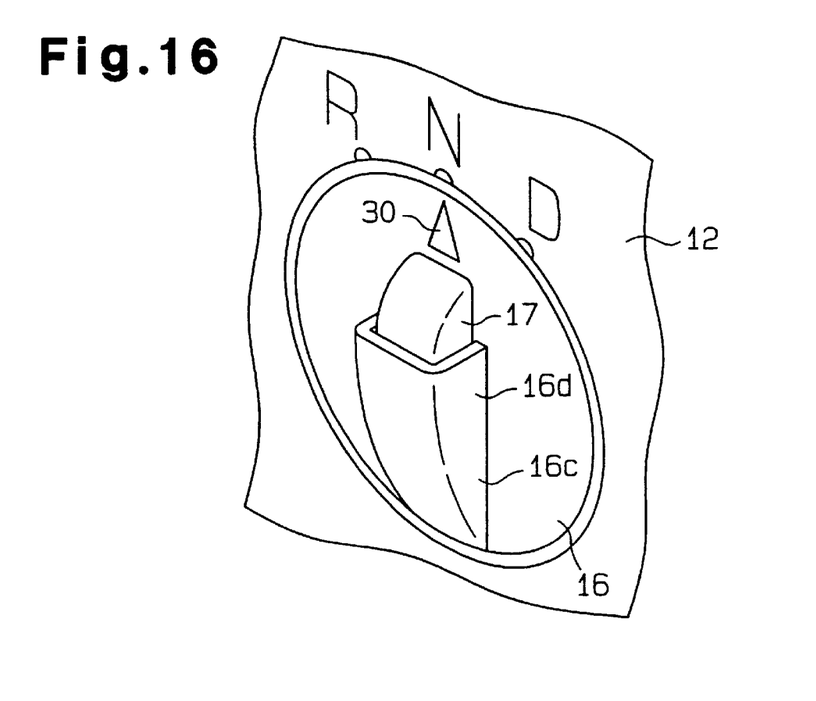
FIG. 16 is a partial perspective view showing an automatic transmission instrument panel according to a further embodiment of the present invention.

As shown in FIG. 16, the P position P may be deleted so that only the alphabetic characters R, N, and D are marked on the instrument panel 12 near the knob 16. In this case, position N is used to provide the functions of both N and P positions in the first and second embodiments.

At least one of the controller 18 and the coil 21 may be located outside the shift apparatus 13. For example, the coil 21 may be separated from the shift apparatus 13, which is arranged on the instrument panel 12, and be located in, for example, a vehicle door. In the same manner, the controller 18 may be separated from the shift apparatus 13 and be located in, for example, a vehicle door.

The present examples and embodiments are to be considered as illustrative and not restrictive, and the invention is not to be limited to the details given herein, but may be modified within the scope and equivalence of the appended claims.

What is claimed is:

1. A shift apparatus for shifting gears in a vehicle driven by an engine, the shift apparatus comprising:
   a shift selector that rotates between a plurality of predetermined positions to instruct the shifting of gears in accordance with the position of the shift selector;
   a movable engine start actuator arranged at substantially the same location as the shift selector to instruct the starting of the engine when the actuator is pushed;
   a confirming device for confirming that the person operating the shift apparatus is the proper user; and
   an enabling device for enabling the movement of at least one of the shift selector and the engine start actuator based on the confirmation result of the confirming device.

2. The shift apparatus according to claim 1, further comprising:
   a first detector for detecting whether the engine start actuator is pushed; and
   an engine control unit for starting the engine based on the detection result of the first detector.

3. The shift apparatus according to claim 2, wherein the first detector includes an ignition switch, and wherein the ignition switch includes a first electrode arranged on the engine start actuator and two spaced second electrodes arranged on a member opposing the engine start actuator, the first electrode being moved to connect the two spaced second electrodes when the engine start actuator is pushed.

4. The shift apparatus according to claim 2, wherein the first detector includes an ignition sensor, and wherein the ignition sensor includes a magnet arranged on the engine start actuator and a magnetic resistance device arranged on a member opposing the engine start actuator, the magnetic resistance device being moved to oppose the magnet and detect magnetic flux of the magnet when the engine start actuator is pushed.

5. The shift apparatus according to claim 1, wherein the confirming device includes a controller for recognizing the proper user when external data matches prestored data.

6. The shift apparatus according to claim 5, wherein the enabling device includes a solenoid excited and de-excited by the controller, the solenoid having a plunger that interferes with and disables the movement of the engine start actuator when the solenoid is de-excited and moves to a position enabling the movement of the engine start actuator when the solenoid is excited.

7. The shift apparatus according to claim 1, further comprising:
   a second detector for detecting the position of the shift selector; and
   a controller for shifting gears based on the detection result of the second detector.

8. The shift apparatus according to claim 7, wherein the second detector includes:
   a movable electrode rotated integrally with the shift selector;
   a plurality of fixed electrodes arranged along an arcuate path of the movable electrode at locations corresponding to positions that the shift selector moves between, wherein the fixed electrodes output different signals when connected to the movable electrode, and the controller shifts gears based on the signals from the fixed electrodes.

9. The shift apparatus according to claim 7, wherein the second detector includes:
   a magnet rotated integrally with the shift selector;
   a plurality of magnetic resistance devices arranged along an arcuate path of the magnet at locations corresponding to positions that the shift selector moves between, wherein the magnetic resistance devices output different signals when opposing the magnetic resistance devices, and the controller shifts gears based on the signals from the magnetic resistance devices.

10. A shift apparatus for shifting gears in a vehicle driven by an engine, the shift apparatus comprising:
    a shift selector that rotates between a plurality of predetermined positions to instruct the shifting of gears in accordance with the position of the shift selector;
    a movable engine start actuator arranged at substantially the same location as the shift selector to instruct the starting of the engine when the actuator is pushed;
    a confirming device for confirming that the person operating the shift apparatus is the proper user;
    an enabling device for enabling the movement of the engine start actuator based on the confirmation result of the confirming device;
    a first detector for detecting whether the engine start actuator is pushed;
    a second detector for detecting the position of the shift selector; and
    a controller for starting the engine based on the detection result of the first detector and for shifting gears based on the detection result of the second detector.

11. The shift apparatus according to claim 10, wherein the first detector includes an ignition switch, and wherein the ignition switch includes a first electrode arranged on the engine start actuator and two spaced second electrodes arranged on a member opposing the engine start actuator, the first electrode being moved to connect the two spaced second electrodes when the engine start actuator is pushed.

12. The shift apparatus according to claim 10, wherein the first detector includes an ignition sensor, and wherein the ignition sensor includes a magnet arranged on the engine start actuator and a magnetic resistance device arranged on a member opposing the engine start actuator, the magnetic resistance device being moved to oppose the magnet and detect magnetic flux of the magnet when the engine start actuator is pushed.

13. The shift apparatus according to claim 10, wherein the confirming device and the controller are formed by a common control unit, and the confirming device recognizes the proper user when external data matches prestored data.

14. The shift apparatus according to claim 13, wherein the enabling device includes a solenoid excited and de-excited by the control unit, the solenoid having a plunger that interferes with and disables the movement of the engine start actuator when the solenoid is de-excited and moves to a position enabling the movement of the engine start actuator when the solenoid is excited.

15. The shift apparatus according to claim 10, wherein the second detector includes:

a movable electrode rotated integrally with the shift selector;

a plurality of fixed electrodes arranged along an arcuate path of the movable electrode at locations corresponding to positions that the shift selector moves between, wherein the fixed electrodes output different signals when connected to the movable electrode, and the controlling means shifts gears based on the signals from the fixed electrodes.

16. The shift apparatus according to claim 10, wherein the second detector includes:

a magnet rotated integrally with the shift selector;

a plurality of magnetic resistance devices arranged along an arcuate path of the magnet at locations corresponding to positions that the shift selector moves between, wherein the magnetic resistance devices output different signals when opposing the magnetic resistance devices, and the controller shifts gears based on the signals from the magnetic resistance devices.

* * * * *